United States Patent
Fong et al.

(10) Patent No.: US 6,225,430 B1
(45) Date of Patent: May 1, 2001

(54) SULFOBETAINE-CONTAINING POLYMERS AND THEIR UTILITY AS CALCIUM CARBONATE SCALE INHIBITORS

(75) Inventors: Dodd W. Fong; Charles F. Marth, both of Naperville; Ronald V. Davis, Geneva, all of IL (US)

(73) Assignee: Nalco Chemical Company, Naperville, IL (US)

(*) Notice: Subject to any disclaimer, the term of this patent is extended or adjusted under 35 U.S.C. 154(b) by 0 days.

(21) Appl. No.: 09/078,463

(22) Filed: May 14, 1998

Related U.S. Application Data

(62) Division of application No. 08/715,778, filed on Sep. 19, 1996, now Pat. No. 5,788,866.

(51) Int. Cl.$^7$ .................................................. C08F 122/04
(52) U.S. Cl. .......................................... 526/271; 526/287
(58) Field of Search ..................................... 526/287, 271

(56) References Cited

U.S. PATENT DOCUMENTS

| | | | |
|---|---|---|---|
| 4,088,678 | 5/1978 | Matt et al. | |
| 4,585,846 | 4/1986 | Schulz et al. | 526/287 |
| 4,801,388 | 1/1989 | Fong et al. | 210/701 |
| 4,913,824 | 4/1990 | Kneller | 210/701 |
| 5,015,390 | 5/1991 | Chen et al. | 210/698 |
| 5,087,376 | 2/1992 | Bendiksen et al. | 210/700 |
| 5,415,782 | 5/1995 | Dimas | 210/698 |

FOREIGN PATENT DOCUMENTS 42 00 132 A 1   7/1993  (DE).

OTHER PUBLICATIONS

Molyneux, P., Water–Soluble Syn. Polym: Properties and Behavior, vol. I, p. 76, 77, 90, 91 (CRC Press) 1987.*

* cited by examiner

Primary Examiner—Christopher Henderson
(74) Attorney, Agent, or Firm—Michael B. Martin; Walter C. Danison; Thomas M. Breininger

(57) ABSTRACT

The invention is a water-soluble N,N-diallyl-N-alkyl-N-(sulfoalkyl) ammonium betaine containing copolymer, wherein said copolymer is formed from the polymerization of an N,N-diallyl-N-alkyl-N-(sulfoalkyl) ammonium betaine of the formula:

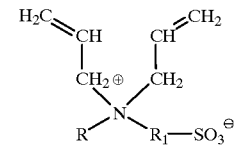

wherein R is selected from the group consisting of alkyl and aryl groups, and $R_1$ is selected from the group consisting of alkyl groups, aryl groups, and alkylaryl groups, and an anionic monomer, and the invention is also a method of inhibiting the precipitation and deposition of scale on metal surfaces in contact with industrial cooling waters comprising the addition of an effective, scale-inhibiting amount of a water-soluble N,N-diallyl-N-alkyl-N-(sulfoalkyl) ammonium betaine containing copolymer, wherein said copolymer is formed from the polymerization of a betaine of the formula:

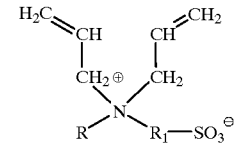

wherein R is selected from the group consisting of alkyl and aryl groups, and $R_1$ is selected from the group consisting of alkyl groups, aryl groups, and alkylaryl groups, and an anionic monomer.

10 Claims, No Drawings

SULFOBETAINE-CONTAINING POLYMERS AND THEIR UTILITY AS CALCIUM CARBONATE SCALE INHIBITORS

CROSSREFERENCE TO RELATED APPLICATION(S)

This is a divisional of Ser. No. 08/715,778 filed Sep. 19, 1996 now U.S. Pat. No. 5,788,866.

FIELD OF THE INVENTION

The invention is a water-soluble N,N-diallyl-N-alkyl-N-(sulfoalkyl) ammonium betaine containing copolymer, wherein said copolymer is formed from the polymerization of an N,N-diallyl-N-alkyl-N-(sulfoalkyl) ammonium betaine of the formula:

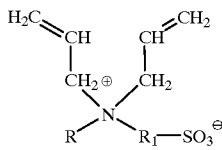

wherein R is selected from the group consisting of alkyl and aryl groups, and $R_1$ is selected from the group consisting of alkyl groups, aryl groups, and alkylaryl groups, and an anionic monomer.

The invention is also a method of inhibiting the precipitation and deposition of scale on metal surfaces in contact with industrial cooling waters comprising the addition of an effective, scale-inhibiting amount of a water-soluble N,N-diallyl-N-alkyl-N-(sulfoalkyl) ammonium betaine containing copolymer, wherein said copolymer is formed from the polymerization of a betaine of the formula:

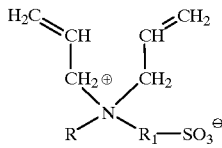

wherein R is selected from the group consisting of alkyl and aryl groups, and $R_1$ is selected from the group consisting of alkyl groups, aryl groups, and alkylaryl groups, and an anionic monomer.

A preferred polymer is a water-soluble copolymer of N,N-diallyl-N-methyl-N-(2-sulfoethyl) ammonium betaine and acrylic acid.

BACKGROUND OF THE INVENTION

The utilization of water which contains certain inorganic impurities, and the production and processing of crude oil water mixtures containing such impurities, is plagued by the precipitation of these impurities with subsequent scale formation. In the case of water which contains these contaminants the harmful effects of scale formation are generally confined to the reduction of the capacity or bore of receptacles and conduits employed to store and convey the contaminated water. In the case of conduits, the impedance of flow is an obvious consequence. However, a number of equally consequential problems are realized in specific utilizations of contaminated water. For example scale formed upon the surfaces of storage vessels and conveying lines for process water may break loose and these large masses of deposit are entrained in and conveyed by the process water to damage and clog equipment through which the water is passed. e.g., tubes, valves, filters and screens. In addition, these crystalline deposits may appear in and detract from, the final product which is derived from the process, e.g., paper formed from an aqueous suspension of pulp. Furthermore, when the contaminated water is involved in a heat exchange process, as either the "hot" or "cold" medium, scale will be formed upon the heat exchange surfaces which are contacted by the water. Such scale formation forms an insulating or thermal opacifying barrier which impairs heat transfer efficiency as well as impeding flow through the system.

Scale can also be formed during evaporative cooling, when the level of dissolved ionic species will increase as water from the solution evaporates. Scale will then form when the concentration of a salt exceeds its solubility under the conditions experienced. This scaling process is typically observed in evaporative cooling towers, and the buildup of scale on the tower fill can cause a large decrease in tower efficiency.

While calcium sulfate and calcium carbonate are primary contributors to scale formation, other salts of alkaline-earth metals and the aluminum silicates are also offenders, e.g., magnesium carbonate, barium sulfate, the aluminum silicates provided by silts of the bentonitic, illitic, and kaolinitic types among others. When phosphate anions are present, either naturally or added to the system, calcium phosphate scaling can also be significant.

Many other industrial waters, while not being scale forming, tend to be corrosive. Such waters, when in contact with a variety of metal surfaces such as ferrous metals, aluminum, copper and its alloys, tend to corrode one or more of such metals or alloys. A variety of compounds have been suggested to alleviate these problems. Such materials are low molecular weight polyacrylic acid polymers. Corrosive waters of this type are usually acidic in pH and are commonly found in closed recirculating systems.

Numerous compounds have been added to these industrial waters in an attempt to prevent or reduce scale and corrosion. One such class of materials are the well known organophosphonates which are illustrated by the compounds hydroxyethylidene diphosphonic acid (HEDP) and phosphonobutane tricarboxylic acid (PBTC). Another group of active scale and corrosion inhibitors are the monosodium phosphinicobis (succinic acids) which are described in U.S. Pat. No. 4,088,678. Further, N,N-bis(phosphono methyl) derivative compounds in combination with homo or copolymers are disclosed for inhibition of calcium carbonate deposition in U.S. Pat. No. 5,087,376.

Most industrial waters contain alkaline earth metal cations, such as calcium, barium, magnesium, etc. and several anions such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate ion exceed the solubility of the calcium carbonate reaction products, a solid phase of calcium carbonate will form. Calcium carbonate is the most common form of scale in many industrial processes.

Solubility product concentrations are exceeded for various reasons, such as partial evaporation of the water phase, change in pH, pressure or temperature, and the introduction of additional ions which form insoluble compounds with the ions already present in the solution.

As these reaction products precipitate on surfaces of the water carrying system, they form scale or deposits. This accumulation prevents effective heat transfer, interferes with fluid flow, facilitates corrosive processes and harbors bacteria. This scale is an expensive problem in many industrial water systems causing delays and shutdowns for cleaning and removal.

Scale deposits are generated and extended principally by means of crystal growth; and various approaches to reducing scale development have accordingly included inhibition of crystal growth, modification of crystal growth and dispersion of the scale-forming minerals.

Various polymeric treatments for scale control exist Among them are the use of anionic co- or ter-polymers of N-vinyl-2-pyrrolidone or vinyl amide, as disclosed in U.S. Pat. No. 4,913,824; the use of maleic anhydride/quaternary ammonium-type polymers as disclosed in U.S. Pat. No. 5,015,390 and the use of co- and ter-polymers of (meth) acrylic acid and sulfoalkyl(meth) acrylamide as disclosed in U.S. Pat. No. 4,801,388.

Co-polymerization of N-(4-sulfoalkyl)N-methyldiallyl ammonium betaines with N-vinyl pyrrolidone or acrylamide to obtain a water-soluble co-polymer has been disclosed in U. S. Pat. No. 4,585,846.

However, there is still a need for a polymeric treatment to more efficiently combat scale. The polymers described herein accomplish this purpose.

SUMMARY OF THE INVENTION

The invention is a water-soluble N,N-diallyl-N-alkyl-N-(sulfoalkyl) ammonium betaine containing copolymer, wherein said copolymer is formed from the polymerization of an N,N-diallyl-N-alkyl-N-(sulfoalkyl) ammonium betaine of the formula:

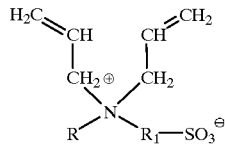

wherein R is selected from the group consisting of alkyl and aryl groups, and $R_1$ is selected from the group consisting of alkyl groups, aryl groups, and alkylaryl groups, and an anionic monomer.

The invention is also a method of inhibiting the precipitation and deposition of scale on metal surfaces in contact with industrial cooling waters comprising the addition of an effective, scale-inhibiting amount of a water-soluble N,N-diallyl-N-alkyl-N-(sulfoalkyl) ammonium betaine containing copolymer, wherein said copolymer is formed from the polymerization of a betaine of the formula:

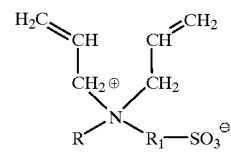

wherein R is selected from the group consisting of alkyl and aryl groups, and $R_1$ is selected from the group consisting of alkyl groups, aryl groups, and alkylaryl groups, and an anionic monomer.

A preferred polymer is a water-soluble copolymer of N,N-diallyl-N-methyl-N-(2-sulfoethyl) ammonium betaine and acrylic acid.

DESCRIPTION OF THE INVENTION

The invention is a water-soluble N,N-diallyl-N-alkyl-N-(sulfoalkyl) ammonium betaine containing copolymer, wherein said copolymer is formed from the polymerization of an N,N-diallyl-N-alkyl-N-(sulfoalkyl) ammonium betaine of the formula:

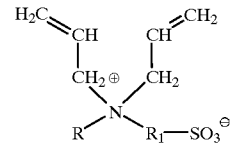

wherein R is selected from the group consisting of alkyl and aryl groups, and $R_1$ is selected from the group consisting of alkyl groups, aryl groups, and alkylaryl groups, and an anionic monomer.

The copolymer may have R selected from the group consisting of alkyl groups having about 1 to 20 carbon atoms and $R_1$ selected from the group consisting of $C_1$–$C_6$ alkyl groups, phenyl groups, naphthyl groups, benzyl groups, and naphthylmethyl groups.

The copolymer may be formed from an anionic monomer which is selected from the group consisting of acrylic acid, methacrylic acid, maleic anhydride, itaconic acid, vinyl sulfonic acid, styrene sulfonate, sodium acrylamido methyl propane sulfonic acid, and maleic acid.

Preferably, the water-soluble copolymer is of N,N-diallyl-N-methyl-N-(2-sulfoethyl) ammonium betaine and acrylic acid.

The molecular weight of the copolymer may be from about 3,000 to about 100,000. Preferably, the molecular weight is from about 4,000 to about 50,000. Most preferably, the molecular weight is from about 4,000 to about 20,000.

The copolymer may have a molar ratio of N,N-diallyl-N-methyl-N-(2-sulfoethyl) ammonium betaine to acrylic acid of from 0.5:99.5 to 30:70. Preferably, the molar ratio of N,N-diallyl-N-methyl-N-(2-sulfoethyl) ammonium betaine to acrylic acid is from 1:99 to 20:80. Most preferably, the molar ratio of N,N-diallyl-N-methyl-N-(2-sulfoethyl) ammonium betaine to acrylic acid is from 3:97 to 10:90.

The invention is also a method of inhibiting the precipitation and deposition of scale on metal surfaces in contact with industrial cooling waters comprising the addition of an effective, scale-inhibiting amount of a water-soluble N,N- diallyl-N-alkyl-N-(sulfoalkyl) ammonium betaine containing copolymer, wherein said copolymer is formed from the polymerization of a betaine of the formula:

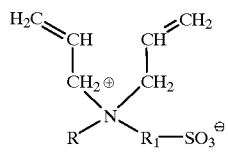

wherein R is selected from the group consisting of alkyl and aryl groups, and $R_1$ is selected from the group consisting of alkyl groups, aryl groups, and alkylaryl groups, and an anionic monomer.

The anionic monomer may be selected from the group consisting of acrylic acid, methacrylic acid, maleic anhydride, itaconic acid, vinyl sulfonic acid, styrene sulfonate, sodium acrylamido methyl propane sulfonic acid, and maleic acid. R may be selected from the group consisting of alkyl groups having about 1 to 20 carbon atoms and $R_1$ may be selected from the group consisting of $C_1$–$C_6$ alkyl groups, phenyl groups, naphthyl groups, benzyl groups, and naphthylmethyl groups.

Preferably, the water-soluble copolymer is composed of N,N-diallyl-N-methyl-N-(2-sulfoethyl) ammonium betaine and acrylic acid.

The molecular weight of the copolymer may be from about 3,000 to about 100,000. Preferably, the molecular weight of the copolymer may be from about 4,000 to about 50,000. Most preferably, the molecular weight of the copolymer may be from about 4,000 to about 20,000.

The molar ratio of N,N-diallyl-N-methyl-N-(2-sulfoethyl) ammonium betaine to acrylic acid may be from 0.5:99.5 to 30:70. Preferably, the molar ratio of N,N-diallyl-N-methyl-N-(2-sulfoethyl) ammonium betaine to acrylic acid is from 1:99 to 20:80. Most preferably the molar ratio of N,N-diallyl-N-methyl-N-(2-sulfoethyl) ammonium betaine to acrylic acid is from 3:97 to 10:90.

The water-soluble copolymer may be added to the industrial cooling water in an amount of about 0.1 ppm to about 300 ppm. Preferably, the water-soluble copolymer may be added to the industrial cooling water in an amount of about 1 ppm to about 100 ppm. Most preferably, the water-soluble copolymer may be added to the industrial cooling water in an amount of about 5 ppm to about 50 ppm.

In the practice of this invention, a water-soluble anionic polymer and a phosphorous-containing scale inhibitor may also be added to the cooling water. The anionic polymer may be a sulfonated polyacrylate and the phosphorous-containing scale inhibitor may be selected from the group consisting of 1-hydroxy ethylidene-1,1-diphosphonic acid, 2-phosphonobutane-1,2,4-tricarboxylic acid, ammonium monophosphate, and aminotris(methylene phosphonic acid). Preferably, about 1 to about 300 ppm of the water-soluble copolymer of N,N-diallyl-N-alkyl-N-(sulfoalkyl) ammonium betaine and acrylic acid, from about 1 to about 50 ppm of the water-soluble anionic polymer and from about 1 to about 50 ppm of the phosphorous-containing scale inhibitor may be added to the cooling water.

The term scale as used herein refers to calcium carbonate or calcium phosphate scale.

In addition to acrylic acid, other co-monomers can be polymerized with N,N-diallyl-N-alkyl-N⁻(sulfoalkyl) ammonium betaine such as methacrylic acid, maleic acid, maleic anhydride, itaconic acid, vinyl sulfonic acid, styrene sulfonate, sodium acrylamidomethylpropane sulfonic acid (AMPS) or nonionic monomers such as acrylamide, N-substituted acrylamides, vinyl acetate, or acrylate esters. As used herein, the term co-polymers is meant to encompass polymers formed from two or more different monomers.

The polymer can be applied to the system at any convenient point. For example, the proper amount of the polymer solution can be added either periodically or continuously to the make-up water.

The copolymers of this invention can be used in conjunction with other cooling tower treating agents such as other scale inhibitors, corrosion inhibitors, and biocides.

As used herein, the term alkyl groups encompasses those groups containing oxygen functionalities such as ether, polyethers and alcohols.

The following examples are presented to describe preferred embodiments and utilities of the invention and are not meant to limit the invention unless otherwise stated in the claims appended hereto.

EXAMPLE 1

The following formulation was used for synthesis of the diallyl, methyltaurine monomer from N-methyltaurine, or sodium salt (formula: Me-NH-CH$_2$CH$_2$SO$_3$Na) and allyl chloride. The systematic name for this monomer is: N,N-diallyl-N-methyl-N-(2-sulfoethyl)ammonium betaine.

| Diallyl Taurine Formulation | | |
|---|---|---|
| | Formulation | |
| Chemical | Weight % | Mole Ratio |
| N-Methyltaurine Na Salt (35% actives) | 60.4% | 1.0 |
| Allyl Chloride | 30.2% | 3.0 |
| NaOH (50%) | 9.4% | 0.9 |
| | 100.0% | |

The 35% aqueous solution of N-methyltaurine sodium salt at pH 12 (138 g) was placed in a glass liner inside a stainless steel pressure reactor, and the first aliquot of ally chloride (35.8 g, 1.5 eq) was added. The reactor was sealed, stirring begun, and the mixture was heated to 80–85° C. at a pressure of 40–80 psi. After stirring for 0.5 hr, NaOH was injected to raise the pH to 11. Additional allyl chloride was added at 1 hour, and more NaOH was introduced at 1.5 hr to increase the pH to 11. A final addition of NaOH was done at 2.0 hr., and the reaction was ended after 2.5 hr.

The reactor was cooled to give 220 g of crude product with pH near 6. DI water (200 g) was added to the crude product, and the solution was concentrated to give approximately 120 g of residue consisting of the desired monomer, NaCl, and some water. DI water (~45 g) was added to give 165 g of solution containing 40 wt % diallyl methyltaurine, plus NaCl. The solution was cooled, and precipitated NaCl was filtered off. The product was >90% the desired diallyl methyltaurine, according to $^{13}$C NMR. The remaining material was mono-allyl methyltaurine.

Low molecular-weight polymers of acrylic acid (AA) and diallyl, methyltaurine (DAMT) were prepared by solution polymerization using redox initiators such as sodium bisulfite and ammonium persulfate. A semi-batch polymerization method was used whereby monomer and initiator solutions were fed into a reactor over the course of 1 hour.

EXAMPLE 2

In a typical stress solubility experiment, 200 ml of a test solution containing 800 ppm $CaCl_2$ and 800 ppm $NaHCO_3$ (each as $CaCO_3$) and the desired amount of inhibitor was placed in a 250 ml Erlenmeyer flask. A sample of the test solution was collected prior to heating and sent for atomic absorption analysis in order to obtain a very accurate initial calcium concentration value.

The sample was then placed in the water bath and the solution is allowed to reach the water bath temperature. The pH electrode and NaOH line of an auto-titrator were then placed in the solution and the sample titrated to pH 9.00. Typically, the auto-titration system was set to the delayed stop mode so that the desired pH is approached slowly and is not overshot. The time at which the sample reaches pH 9.00 was noted, the pH electrode and NaOH line rinsed, and the next sample was titrated to pH 9.00. The pH of the titrated solutions was checked and occasionally adjusted to pH 9.0 during the experiment.

Two hours after a sample was first titrated to pH 9.00, the solution is removed from the water bath, 5 ml of the solution was removed using a syringe and filtered into a weighing boat. A portion of this sample, either 1.0, 2.0 or 3.0 ml, was then placed in a B.U.N. tube for Atomic Absorption (AA) analysis. The amount of solution was selected to give less than 60 ppm calcium (as calcium ion) when diluted to 25 ml. The samples were then analyzed by AA.

The results from the diluted AA analysis sample, normally reported as ppm calcium, were then used to calculate the concentration of soluble calcium in the heated test solution.

This experimental procedure was utilized to obtain the results detailed in Table I. Lower ppm values for calcium precipitate indicate better scale inhibition. Table I results show that at above a 150 ppm treat rate, the polymers of the instant invention show performance as a calcium carbonate scale inhibitor which is superior to that of poly(acrylic acid).

TABLE I

Acrylate Polymer Results

| Inhibitor | Inhibitor Concentration[2] (ppm as actives) | Calcium Precipitate (ppm as $CaCO_3$) |
|---|---|---|
| p(AA)[1] | 5 | 620 |
|  | 10 | 610 |
|  | 20 | 610 |
|  | 40 | 595 |
|  | 80 | 505 |
|  | 100 | 470 |
|  | 150 | 495 |
|  | 200 | 470 |
|  | 250 | 400 |
|  | 300 | 415 |
| p(AA/DAMT)[3] | 5 | 690 |
|  | 10 | 620 |
|  | 20 | 630 |
|  | 40 | 615 |
|  | 80 | 580 |
|  | 100 | 520 |
|  | 150 | 320 |
|  | 200 | 215 |
|  | 250 | 210 |
|  | 300 | 125 |

[1]poly(acrylic acid), 5,000 MW
[2]5 ppm 2-phosphono butane 1,2,4 tricarboxylic acid added to each test solution
[3]90/10 mole ratio of poly (acrylic acid/dially methyltaurine) 6,000 MW

EXAMPLE 3

The experimental procedure described in Example 2 was utilized to obtain the results detailed in Table II.

TABLE II

Sulfonated Polymers Results

| Inhibitor | Inhibitor Concentration (ppm as actives) | Calcium Precipitate (ppm as $CaCO_3$) |
|---|---|---|
| p(AA/AMPS)[1] | 5 | 800 |
|  | 10 | 795 |
|  | 20 | 795 |
|  | 40 | 790 |
|  | 80 | 772 |
| p(AA/DADMAC)[2] | 5 | 795 |
|  | 10 | 792 |
|  | 20 | 780 |
|  | 40 | 775 |
|  | 80 | 745 |
| p(AA/DAMT)[3] | 5 | 790 |
|  | 10 | 750 |
|  | 20 | 715 |
|  | 40 | 620 |
|  | 80 | 590 |

[1]90/10 mole ratio of acrylic acid to sodium AMPS 6,000 MW
[2]90/10 mole ratio of acrylic acid to diallyl dimethyl ammonium chloride 4,900 MW
[3]90/10 mole ratio of poly (acrylic acid/dially methyltaurine) 6,000 MW Since lower values for the amount of calcium precipitate were obtained for p(AA/DAMT) than for the other polymers tested, the superiority of polymers of the instant invention is demonstrated. In addition these results show that the sulfobetaine structure ($R_3N^+$—$CH_2$—$CH_2$—$SO_3^-$) in the polymers is needed for best performance. The polymers containing either a sulfonate or a cationic monomer (DADMAC) did not perform as well.

EXAMPLE 4

A hardness solution of calcium and magnesium in a 2:1 Ca:Mg ratio and an alkaline solution of sodium carbonate/sodium bicarbonate buffered at pH 10 were simultaneously added to 200 mL of an inhibitor test solution. The pH of the inhibitor test solution was adjusted to between 7 and 10. Calcium carbonate precipitation was detected by turbidity using a Brinkman PC-800 Colorimeter (420 nm wavelength). The hardness solution was prepared by adding 3.80 g calcium acetate and 2.57 g magnesium acetate tetrahydrate to distilled water (100 mL; total volume). The alkaline solution was prepared by adding 2.01 g sodium bicarbonate and 1.27 g sodium carbonate to distilled water (100 mL total volume). A Masterflex pump delivered the hardness and alkaline solutions at 2.0 mL/min to the magnetically stirred test solution. All solutions were aqueous and maintained at a constant temperature of 45° C. The titration endpoint, expressed as the maximum calcium concentration (as calcium carbonate) before the onset of turbidity, was calculated from the elapsed time to a turbidity inflection on a strip chart recorder.

The procedure above was utilized to obtain the results of Table III. The p(AA/DAMT) showed superior performance to PBTC or p(AA), as illustrated by the larger endpoint values obtained for DAMT-containing polymers. In particular, the DAMT-containing polymers perform very well at high inhibitor levels, where the effectiveness of the other inhibitors falls off.

TABLE III

| Compound | Monomer Ratio[1] | Molecular Weight | Ca Endpoint[2] (ppm) at Inhibitor Levels of: 5 ppm | 20 ppm | 50 ppm | 100 ppm |
|---|---|---|---|---|---|---|
| poly (AA)[3] | 100% AA | 5,300 | 383 | 395 | 350 | 287 |
| poly (AA)[3] | 100% AA | 8,900 | 395 | 395 | 212 | 154 |
| p(AA/DAMT)[4] | 70:30 | 4,400 | 372 | 417 | 473 | 593 |
| p(AA/DAMT)[4] | 80:20 | 8,400 | 383 | 439 | 550 | 615 |
| p(AA/DAMT)[4] | 90:10 | 9,900 | 383 | 417 | 462 | 593 |
| PBTC[5] | — | — | 372 | 383 | — | 383 |
| diallyl-methyl taurine monomer | — | — | — | 154 | — | 189 |

[1]The AA/diallyl methyltaurine monomer ratios are given in mole percent.
[2]Calcium endpoints are listed in ppm as $CaCO_3$
[3]poly(acrylic acid)
[4]poly(acrylic acid/diallyl methyltaurine)
[5]2-phosphonobutane 1,2,4-tricarboxylic acid

EXAMPLE 5

In a typical calcium phosphate dispersancy experiment, a solution containing calcium (250 ppm as $CaCO_3$), magnesium (125 ppm as $CaCO_3$), orthophosphate (10 ppm as $PO_4^{3-}$) and inhibitor (10 ppm as the acid) was maintained at 70° C. for four hours. During this time, the pH of the stirred solution was kept at 8.50 by automated pH monitoring and addition of 0.1 N NaOH. A blank solution, containing no inhibitor treatment was tested along side the inhibitor containing solutions. The concentration of phosphate in unfiltered samples (4.0 ml) taken from the test solution at the beginning of the experiment prior to calcium phosphate precipitation was compared with the concentration of phosphate in filtered samples (20.0 ml through a 0.45 micron filter) collected at the end of the experiment. Percent phosphate dispersancy was calculated as:

$$\% \text{ Disp.} = \frac{[\text{filtered final sample}] - [\text{filtered blank}]}{[\text{unfiltered final sample}] - [\text{filtered blank}]} \times 100$$

with values approaching 100% indicating good calcium phosphate dispersancy.

The experimental procedure described above was used to obtain the results in Table IV. The best inhibition of calcium phosphate scale was observed for the low molecular weight copolymers of acrylic acid and DAMT. In addition, high performance correlated with higher levels of DAMT in the copolymer. A copolymer of acrylic acid and DADMAC which also contained 10 mole percent sulfonate groups was tested as a control. This material did not perform well, showing the importance of the sulfobetaine structure present in polymers made from diallyl, methyltaurine.

TABLE IV

Calcium Phosphate Inhibition Tests

| Polymer | Molecular Weight | Monomer Ratio | Percent Inhibition |
|---|---|---|---|
| Poly(AA/DAMT) | 5,900 | 70/30 | 97% |
| Poly(AA/DAMT) | 21,900 | 70/30 | 93% |
| Poly(AA/DAMT) | 30,000 | 70/30 | 82% |
| Poly(AA/DAMT) | 6,600 | 90/10 | 46% |
| Poly(AA/DAMT) | 17,000 | 90/10 | 17% |
| Poly(AA/DADMAC), 10% sulfomethylated | 5,600 | 70/30 | 2% |
| none | | | 0% |

EXAMPLE 6

In a typical calcium tolerance experiment, 200 ml of the desired calcium solution (500 to 1000 ppm) were placed in a 250 ml beaker and the pH was adjusted to 11 with 0.1 N NaOH. The calcium solution was placed in a jacketed flask containing sufficient water to equal the level of solution in the beaker. Heated water from a 52° water bath was then passed through the jacketed flask. Once a stable calcium solution temperature was achieved, 600 ppm inhibitor solution (pH adjusted to 11) was added dropwise using a buret. The solution was monitored visually to determine the first signs of turbidity. Once evidence of turbidity within the calcium solution was noted, the titration was halted and the amount of inhibitor solution added to the calcium solution was recorded. The concentration of calcium in the test solution at the onset of turbidity was calculated taking into account the volume of the added inhibitor solution. Using the total solution volume in the beaker at the onset of turbidity, the concentration of inhibitor present in the test solution at the onset of turbidity was calculated.

The ability of a potential calcium carbonate scale inhibitor to control deposit formation is dependent on the inhibitors availability during scale formation. Inhibitor chemistries which are stable towards precipitation at high calcium ion concentrations in the calcium tolerance test have a wider application range than less calcium tolerant treatments. As shown in Table V, the polymers of the instant invention display superior performance in calcium tolerance testing.

TABLE V

Calcium Tolerance

| Inhibitor | Calcium Concentration (ppm) | Inhibitor Concentration at Onset of Turbidity[4] (ppm) |
|---|---|---|
| PBTC[1] | 480 | 19 |
| | 580 | 26 |
| | 670 | 25 |
| | 780 | 14 |
| | 880 | 9 |
| p(AA)[2] | 480 | 18 |
| | 580 | 14 |
| | 670 | 14 |
| | 780 | 13 |
| | 880 | 12 |
| p(AA/DAMT)[3] | 450 | 57 |
| | 550 | 50 |
| | 640 | 48 |
| | 750 | 36 |
| | 870 | 22 |

[1]2-phosphonobutane 1,2,4-tricarboxylic acid
[2]poly(acrylic acid) 5,000 MW
[3]90/10 mole ratio of acrylic acid to diallyl methyltaurine 9,900 MW
[4]higher numbers for inhibitor concentration indicate better calcium tolerance Changes can be in the composition, operation and arrangement of the method of the present invention described wherein without departing from the concept and scope of the invention as defined in the following claims:

What is claimed is:

1. A water-soluble N,N-diallyl-N-alkyl-N-(sulfoalkyl) ammonium betaine containing copolymer, wherein said copolymer is formed from the polymerization of an N,N-diallyl-N-alkyl-N-(sulfoalkyl) ammonium betaine of the formula:

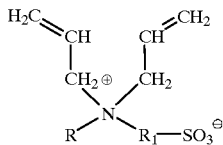

wherein R is selected from the group consisting of alkyl and aryl groups, and $R_1$ is selected from the group consisting of alkyl groups, aryl groups, and alkylaryl groups, and an anionic monomer.

2. The copolymer of claim 1 wherein R is selected from the group consisting of alkyl groups having about 1 to 20 carbon atoms and $R_1$ is selected from the group consisting of $C_1$–$C_6$ alkyl groups, phenyl groups, naphthyl groups, benzyl groups, and naphthylmethyl groups.

3. The copolymer of claim 1 wherein said anionic monomer is selected from the group consisting of acrylic acid, methacrylic acid, maleic anhydride, itaconic acid, vinyl sulfonic acid, styrene sulfonate, sodium acrylamido methyl propane sulfonic acid, and maleic acid.

4. A water-soluble copolymer of N,N-diallyl-N-methyl-N-(2-sulfoethyl) ammonium betaine and acrylic acid.

5. The copolymer of claim 4 wherein the molecular weight is from about 3,000 to about 100,000.

6. The copolymer of claim 4 wherein the molecular weight is from about 4,000 to about 50,000.

7. The copolymer of claim 4 wherein the molecular weight is from about 4,000 to about 20,000.

8. The copolymer of claim 4 wherein the molar ratio of N,N-diallyl-N-methyl-N-(2-sulfoethyl) ammonium betaine to acrylic acid is from 0.5:99.5 to 30:70.

9. The copolymer of claim 4 wherein the molar ratio of N,N-diallyl-N-methyl-N-(2-sulfoethyl) ammonium betaine to acrylic acid is from 1:99 to 20:80.

10. The copolymer of claim 4 wherein the molar ratio of N,N-diallyl-N-methyl-N-(2-sulfoethyl) ammonium betaine to acrylic acid is from 3:97 to 10:90.

* * * * *